US006501597B1

United States Patent
Pitt et al.

(10) Patent No.: US 6,501,597 B1
(45) Date of Patent: Dec. 31, 2002

(54) OPTICAL AMPLIFIER USING WAVELENGTH CONVERTER

(75) Inventors: Donald A. Pitt, Portola Valley, CA (US); Keith A. Sigg, Palo Alto, CA (US); Jing Tian, Mountain View, CA (US); Gary L. Woods, Sunnyvale, CA (US)

(73) Assignee: SpectraLane, Inc., Santa Clara, CA (US)

( * ) Notice: Subject to any disclaimer, the term of this patent is extended or adjusted under 35 U.S.C. 154(b) by 0 days.

(21) Appl. No.: 09/924,196

(22) Filed: Aug. 7, 2001

(51) Int. Cl.$^7$ .................................. H01S 3/00
(52) U.S. Cl. ..................... 359/349; 359/333
(58) Field of Search ................ 359/349, 341.1, 359/333

(56) References Cited

U.S. PATENT DOCUMENTS

| 5,434,700 A | 7/1995 | Yoo | ............................ 359/332 |
| 6,115,173 A | * 9/2000 | Tanaka et al. | ............... 359/333 |
| 6,356,384 B1 | * 3/2002 | Islam | ......................... 359/334 |

FOREIGN PATENT DOCUMENTS

JP 2001255563 A * 9/2001

OTHER PUBLICATIONS

C.Q. Xu et al., "Wavelength conversions~1.5μm by difference frequency generation in periodically domain–inverted LiNbO$_3$ channel waveguides", Appl. Phys. Lett. 63(9), Aug. 30, 1993, pp. 1170–1172.

Ming–Hsien Chou, dissertation entitled "Optical Frequency Mixers Using Three Wave Mixing For Optical Fiber Communications", submitted to Stanford University, G.L. No. 5671, 1999, pp. v—129.

* cited by examiner

*Primary Examiner*—Mark Hellner
(74) *Attorney, Agent, or Firm*—Skjervan Morill LLP; Norman R. Klivans

(57) ABSTRACT

An optical amplifier suitable for use in optical communication systems such as for telecommunications or cable television provides, for purposes of wavelength division multiplexed communications, the ability to amplify optical signals in both the C band, L band, and S band using conventional EDFA amplifiers. The S band, normally not amplifiable by EDFAs, here is amplified by converting the S band signal to a C band optical signal, providing optical amplification by an EDFA, then reconverting the amplified C band optical signal back to the S band in the same or a subsequent amplifier stage. The wavelength converters are, for instance, periodically poled lithium niobate devices using three-wave mixing, and employing difference frequency generation techniques.

28 Claims, 2 Drawing Sheets

OPTICAL AMPLIFIER USING WAVELENGTH CONVERTER

FIELD OF THE INVENTION

This invention relates to optical communications and more specifically to amplification of optical signals.

BACKGROUND

Optical communications are an important field. Typically optical signals are carried on optical fibers from a transmitter to a receiver. Such systems typically include optical amplifiers that amplify the signals in the optical (not electrical) regime. Such systems are used, for instance, in telecommunications and cable television. The growing demand for more bandwidth (ability to carry more information on a particular fiber) has expanded the use of what is called wavelength division multiplexing. This means one fiber carries simultaneously optical signals at several different wavelengths (frequencies). Presently available optical equipment including the transmitters, receivers and optical amplifiers typically operates in the spectrum of 1530–1625 nanometers. The most commonly used portion of this spectrum is the C band which is 1530–1565 nanometers. Immediately above the C band is the L band which is about 1565–1625 nanometers. The S band is below the C band at about 1460–1530 nanometers. Most presently available optical equipment operates in the C band. One reason for this is that one of the key components, which are the optical amplifiers, are typically erbium-doped fiber amplifiers (EDFA). An EDFA includes a length of optical fiber doped with the element erbium and which is pumped with a pump laser. These erbium-doped fiber amplifiers typically amplify wavelengths in the C band. Erbium-doped fiber amplifiers also can amplify wavelengths in the L band. However, for physical reasons they are not capable of amplifying wavelengths in the S band. This is a significant drawback since other types of optical amplifiers have major shortcomings and it is very desirable to use the S band in wavelength division multiplexed optical communication systems. However, this shortcoming of EDFA's generally prevents that. Note that a typical optical communication system requires amplification approximately every 80 kilometers of optical fiber due to signal losses in the fiber. It is of course possible to amplify signals in the electrical domain using a regenerator which converts the optical signal to an electrical signal, amplifies the electrical signal, and then reconverts it to an optical signal. However, this process involves its own losses and the regenerators are complex and expensive, so it is desirable to avoid their use if possible.

Hence, in the prior art there still remains the problem of the inability to effectively use the S band for optical communication without converting the signal into the electrical regime and reconverting it back to the optical regime.

SUMMARY

In accordance with this invention, an optical amplifier is provided which allows amplification in the optical regime of S band optical signals. In one embodiment this is done by taking the S band signal, converting it using an optical wavelength converter to a C band wavelength signal, amplifying the C band signal using an EDFA, then reconverting the amplified C band signal back into an S band signal. This uses a first wavelength converter which converts the S band signal to the C band and a second wavelength converter which converts the amplified C band signal back to the S band. Typically, the amplifier in addition to operating in the S band also includes paths for C band and L band signals which themselves are amplified using their own EDFA, without conversion.

In another embodiment, the C band and S band signals are each converted to the other band in one amplifier stage, the converted signals are propagated along a span of fiber, and then the converted signals are reconverted to their original bands in the next amplifier stage. In each stage only one of the C band or S band signals is amplified. The L band signals similarly are amplified in every other amplifier stage. This requires somewhat shorter spans of fiber between stages than other embodiments but provides better power balance.

The conversion of the S band to the C band and back again is performed completely in the optical regime in these embodiments. Moreover, such a system allows wavelength division multiplexing of S band, C band, and L band signals using coarse demultiplexers and multiplexers to separate the three bands and amplify them each using a separate path including an EDFA. The multiplexing and demultiplexing are performed using conventional optical components.

The wavelength converters used to convert the S band to C band and vice versa are, for instance, optical devices based on non-linear optical materials which shift entire bands of wavelengths to the desired other band. One example of such a device is a converter employing difference frequency generation (DFG) techniques in a PPLN (periodically poled lithium niobate) waveguide.

DETAILED DESCRIPTION

Figure 1:
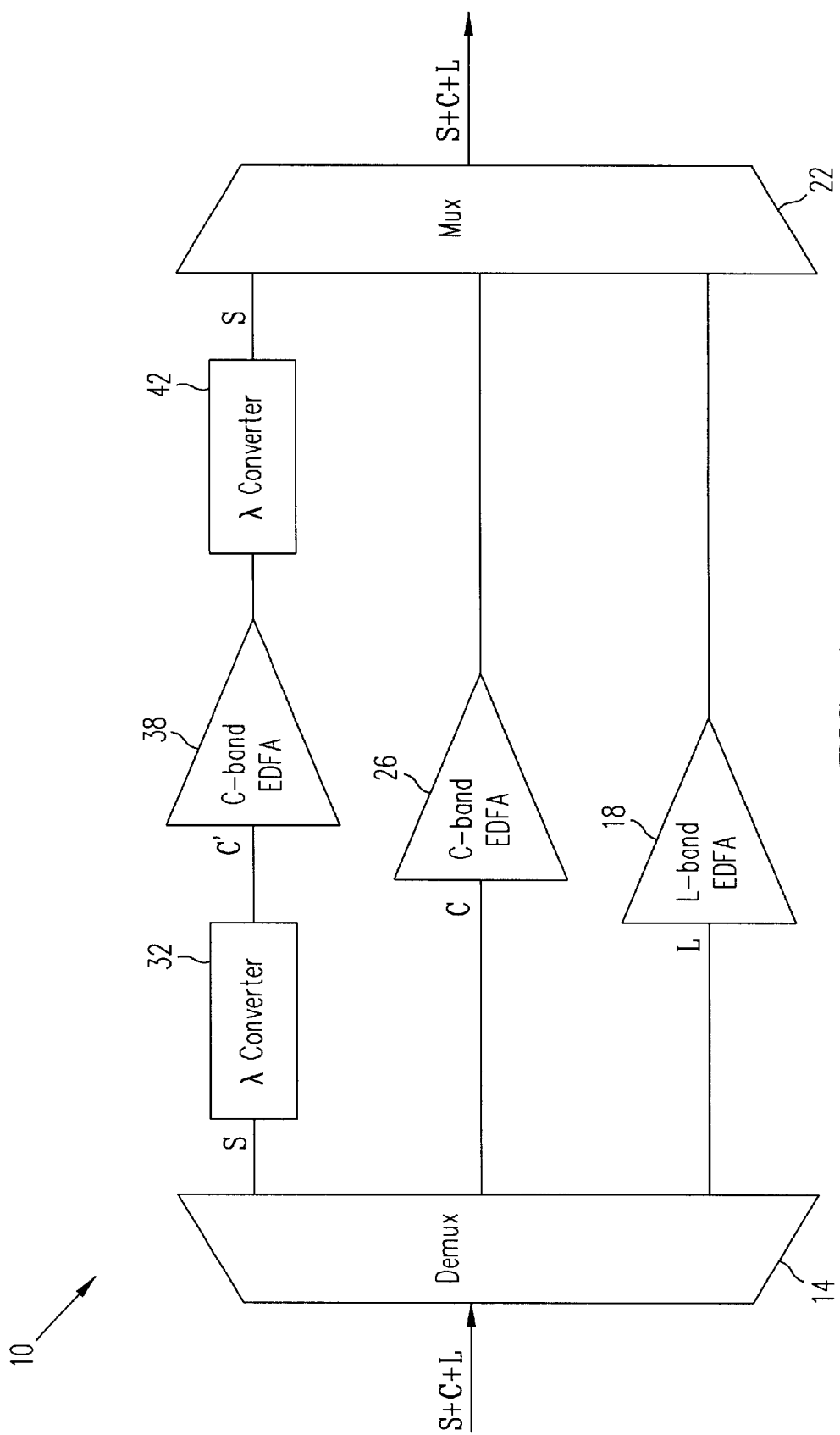
FIG. 1 shows one embodiment of the present optical amplifier.

FIG. 1 shows in a block diagram a single stage optical amplifier in accordance with one embodiment of this disclosure. It is to be understood that this amplifier is fabricated and assembled using conventional optical technology and components. The input light beam incident from the left side of the figure is in this case a wavelength division multiplexed optical signal including wavelengths in the S band, C band, and L band. Typically this signal is carried in a conventional optical fiber which is conventionally connected (e.g., pigtailed) to the input port of a conventional optical demultiplexer 14. The depicted optical amplifier 10 includes, downstream of demultiplexer 14, three optical paths. The lowest optical path (as drawn) carries the demultiplexed L band signal from demultiplexer 14 which is input via an optical fiber into a conventional L band EDFA 18. Instead of an EDFA 18, a Raman optical amplifier may be used, if suitable, for the L band. Raman optical amplifiers are somewhat similar to EDFAs, however they use conventional optical fiber, rather than doped optical fiber. Raman optical amplifiers require high pump power and suffer from other drawbacks, so currently they are used less often than EDFA's The amplified L band output signal from EDFA 18 is then applied to one input port of a demultiplexer 22 which is also a conventional optical element commercially available from, for instance, JDS-Uniphase.

The center path carries the demultiplexed C band optical signal which is input to an optical input port of a C band EDFA 26. It is to be understood that each EDFA conventionally includes one or more lengths of conventional doped optical fiber pumped by suitable pump lasers, not shown. The amplified C band optical signal is then input to a second optical input port of multiplexer 22. The uppermost path in amplifier 10 is of most interest. The demultiplexed S band signal is applied to the input terminal of a wavelength converter 32 which converts the S band signal into a C band signal. (The C' designation indicates the result of this conversion.) The C band signal is then applied to the input terminal of a C band EDFA 38, which is essentially identical to C band EDFA 26. The amplified C band signal output from EDFA 38 is then input to the input port of a second wavelength converter 42 which down-converts this signal to the S band and the resulting signal is then applied to the third optical input port of multiplexer 22.

Such wavelength converters are mixers, analogous to the type known in RF (radio frequency) technology. The output wavelength is a known function of the pump wavelength and the input signal wavelength; the pump wavelength may be in or out of the band of the input and output wavelengths.

Conventionally, the multiplexer 22 outputs at its output port the multiplexed S band, C band, and L band signals. It is to be understood that the horizontal lines shown in FIG. 1 typically are lengths of optical fiber (or other suitable waveguides) and in each case the connections to the optical elements are, e.g., conventional pigtail connections or conventional free space connections using lenses. The various mechanical supports, amplifier housing, optical isolators and electric power supplies for the pumping lasers associated with the various EDFAs and wavelength converters are not shown. The FIG. 1 optical amplifier is typically housed in an enclosure of standard size, such as used with a conventional EDFA "line card" and included in the enclosure are a power supply, monitor and control circuitry, and diagnostic circuitry, all of the type known in the optical fiber communications field. Also, typically temperature control (e.g., electric heating) is provided to the wavelength converters for the FIG. 1 amplifier. For a typical PPLN wavelength converter, the temperature is typically maintained at 60–120° C. This heating is enhanced by thermally insulating the enclosure.

While FIG. 1 shows an optical amplifier 10 amplifying S band, C band and L band signals, which are multiplexed together, it is to be understood that in other embodiments, the lower two paths in FIG. 1 are not present and also the demultiplexer and multiplexer are not present. Instead, this embodiment includes only elements 32, 38 and 42 and the intervening optical fibers (or other types of waveguides), thereby allowing amplification using a EDFA or other type of optical amplifier of an S band signal, even though the EDFA itself is not capable of amplifying S band signals. Hence, this embodiment is a sub-combination of the FIG. 1 amplifier which may have utility on its own. For instance, there may be applications where an S band optical signal is required for optical communication and it is desired to amplify it in the optical domain, even though the optical signal itself does not include C band or L band signals.

While there is reference here to wavelength bands, it is to be understood that each band may include numerous channels, each of which is a sub-band within that band. However, there may be only one frequency in use in each band in other embodiments.

Hence, in FIG. 1 it is assumed in one embodiment that the input optical signal extends over all the available bandwidth of S, C and the L bands. The S, C, and L band signals are demultiplexed by demultiplexer 14 into the three separate bands. In one embodiment, all the components shown in FIG. 1 are packaged as a single module within a single housing. This packaged amplifier thus functions as a universal band amplifier covering all of the S, C, and L bands together. In one example, the three bands S, C and L include in total 40 to 120 or more channels, depending on the bandwidth of each channel. A typical performance goal is a bit error rate of less than $10^{-9}$. The typical optical power input to the C band EDFA 38 is approximately 6 dbm. Of course, this is merely exemplary.

Figure 2:
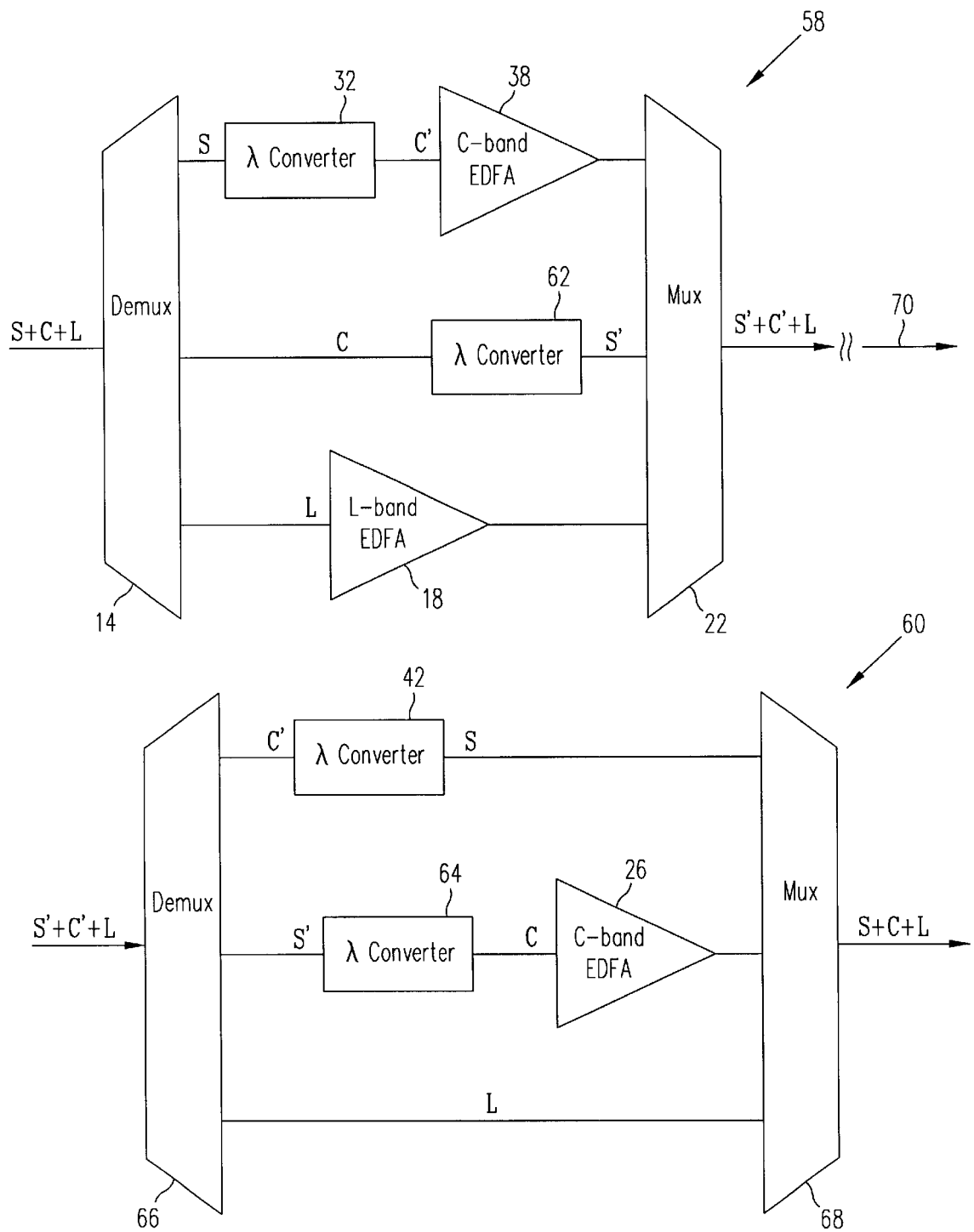
FIG. 2 shows a two stage optical amplifier arrangement in another embodiment.

FIG. 2 shows a two stage optical amplifier arrangement with components similar to those of FIG. 1 identically labeled, for another embodiment. In FIG. 2 there is a first stage amplifier 58 and a second stage amplifier 60. The first stage 58 converts, in its upper path, the S band signal to C band and then amplifies in the C band using EDFA 38. Also, it converts the C band into the S band using an additional wavelength converter 62. The lower (L band path) in stage 58 is identical to that in FIG. 1. The second amplifier stage 60 is typically coupled to first stage 58 by a substantial span 80 (many km) of optical fiber 70. The second stage 60, shown in the lower portion of FIG. 2, includes a second demultiplexer 66 which demultiplexes the received C, L, and S band signals again into the C band, the S band, and L band. As shown, the C band signal is then converted back to the S band by converter 42 while the S band signal is converted back to the C band by converter 64 and then amplified by EDFA 26.

The two stage amplifier arrangement of FIG. 2 (which in other respects is similar to that of FIG. 1) is intended to overcome any power limitations inherent in a single stage amplifier as in FIG. 1. As shown in FIG. 2 where there are a succession of such amplifiers 58, 60, each separated by a span of fiber optic cable 70 and serving as, for instance, repeaters in a telecommunications system, the C band and S band signals "switch places" (with regard to the original information-bearing signals) in each consecutive fiber optic span 70. By this is meant that at each stage the incoming C band signals are translated to the S band, and the incoming S band signals are translated to the C band. This place switching helps ensure that the wavelength conversion elements 32, 62, 42, 64 are not exposed to the high input signal power present at the output of an EDFA. FIG. 2 shows that the L band signals are amplified in every other span 70 along with the C band signals. Alternatively the L band signals are amplified with the S band signals or are amplified in both consecutive stages.

Note that as described above the amplifiers of FIG. 1 or 2 may be housed in the same size enclosure as is a conventional C band EDFA.

As explained above, the individual elements of FIG. 1 and FIG. 2 are conventional. The wavelength converters, unlike the other elements, are typically not now commercially available. However, such wavelength converters are well known in the field. Various known devices achieve this wavelength conversion. One such device is a three-wave mixer using a non-linear material such as periodically poled lithium niobate (PPLN). Other types of material suitable for three-wave mixing are magnesium oxide-lithium niobate or orientation patterned gallium arsenide. It is also possible to use four-wave mixing for wavelength conversion in a material such as a non-linear optical fiber or semiconductor optical amplifier. Another conversion approach is cross-gain or cross-phase modulation in semiconductor optical amplifiers. All of these devices are known in the field.

For example, Yoo U.S. Pat. No. 5,434,700, incorporated herein by reference in its entirety, discloses an all optical wavelength converter. This uses, as do the above-described devices, an optical pump signal applied to a passive waveguide device. The combination performs wavelength conversion on an input optical signal. Yoo discloses, for instance, receiving wavelengths around the 1530 nanometer wavelength and shifting them by, for instance, 20 nanometers in wavelength. Yoo uses a gallium arsenide material for the waveguide device. Yoo also refers to another type of optical converter as disclosed in Applied Physics Letters, Vol. 63, pp. 1170–1172 "Wavelength Conversions-1.5 Micrometer by Difference Frequency Generation Periodically Domain Inverted LINBO Three Channel Wave Guides", August 1993 by Xu et al., incorporated herein by reference in its entirety. Further work on such wavelength conversion devices is disclosed in a dissertation entitled "Optical Frequency Mixers Using Three Wave Mixing For Optical Fiber Communications" by Ming-Hsien Chou, Stanford University, 1999, G.L. No 5671, also incorporated herein by reference in its entirety. This dissertation shows, at page 50, a tapered waveguide providing nonlinear frequency mixing, suitable for use in the present converter, and explains how to fabricate same. In this waveguide the information bearing optical signal and the pump optical signal are both coupled to one edge of the waveguide.

The above publications and others in the field explain in detail how to manufacture and use such wavelength converters. The particular waveguide material selected and parameters of the devices are chosen so as to provide the desired wavelength conversion. Note that a particular device which performs an up-conversion in terms of wavelength will also perform a down-conversion depending on the pump wavelength. Since the C band is narrower than the S band, conversion of S band signals to C band necessarily reduces bandwidth, resulting in fewer channels. Thus typically in the (original) S band signal not all channels will be used.

To make the wavelength converter used in one embodiment, a process similar to those described in the above-referenced patent and publications is used to fabricate a PPLN wave guide for wavelength conversion. Each process step is conventional. First, starting with a lithium niobate wafer, a layer of silicon dioxide is sputtered on the principal surface thereof. Then the electrode configuration is formed on a mask and by lithography the electrode configuration is patterned on the silicon dioxide layer, by conventional etching. The PPLN structure is then formed by applying a suitable high voltage to the wafer which inverts the ferro-electric domain underneath the electrodes. The high voltage is applied using a salt solution as a liquid electrode. See, e.g., the Chou thesis at pages 33–38.

Next, a proton exchanging step takes place using benzoic acid involving the acid in its molten state. Then the wafer is annealed and then diced and polished and then subject to conventional wave guide characterization.

In use, each such converter waveguide is coupled by a length of optical fiber to a pump source such as a laser diode outputting a light beam of suitable wavelength and power. The optical fiber carrying the pump light, as are the optical fibers carrying the information signal to/from the waveguide, is optically coupled to the end surfaces of the waveguide by pigtailing or by a lens, conventionally. The waveguide is installed in the system to receive the input optical signal and output the converted (wavelength shifted) optical signal. The pump wavelength conventionally determines the center wavelength of the signal output from the converter. If the input wavelength is greater than the pump wavelength, there is a wavelength down conversion. If the input wavelength is less than the pump wavelength, there is a wavelength up conversion.

The above described PPLN waveguides support only a single polarization. The Chou thesis shows (page 86) two different schemes to overcome this using either a polarizing beam splitter with feedback, or using two polarizing beam splitters using, e.g., two waveguides on one chip. These polarization diversity schemes are well known in the field. If a polarization insensitive waveguide is used, no such diversity scheme is needed.

While the above disclosure is of a PPLN waveguide for the converter, this is not limiting. Other suitable waveguides use variants of lithium niobate. (Doping advantageously lowers the operating temperature.) Further, other NLO (nonlinear optical) waveguide materials, such as lithium tantalite, are suitable.

Various pumping schemes are available to pump the waveguides, including co- and counter-propagation. The pumping wavelength is typically "in band" relative to the information bearing signal's wavelength(s) so as to allow use of a smaller and lower power pump source, but this is not required. The pumping wavelength can also be a subharmonic of the average of the wavelengths of the input and output pumped signals.

It is to be understand that various types of wavelength converters can be used, depending on the operating parameters of the amplifier in which it is to be installed. Similarly, the type of pump source, and pump power are determined by the particular optical band to be converted and the input power of the optical signal to the wavelength converter.

This disclosure is illustrative and not limiting; further modifications will be apparent to one skilled in the art in light of this disclosure and are intended to fall within the scope of the appended claims.

We claim:

1. An optical amplifier comprising:
   a demultiplexer adapted to receive an optical signal;
   a first optical amplifier coupled to the demultiplexer and which amplifies wavelengths in a first band;
   a second optical amplifier coupled to the demultiplexer and which amplifies wavelengths in a second band;
   a first wavelength converter coupled to the demultiplexer and which converts wavelengths in a third band to the second band;
   a third optical amplifier coupled to the first wavelength converter and which amplifiers wavelengths in the second band;
   a second wavelength converter coupled to the third optical amplifier and which converts wavelengths in the second band to the third band; and
   a multiplexer coupled to the first and second optical amplifiers and to the second wavelength converter and adapted to output an optical signal.

2. The amplifier of claim 1, wherein the first band is L-band, the second band is C-band, and the third band is S-band.

3. The amplifier of claim 1, wherein each of the wavelength converters converts between the S-band and C-band.

4. The amplifier of claim 1, wherein each of the wavelength converters comprises a waveguide formed of a nonlinear optical material.

5. The amplifier of claim 1, wherein at least one of the wavelength converters comprises a waveguide formed of lithium niobate or doped lithium niobate.

6. The amplifier of claim 4, wherein at least one of the waveguides is quasi-phase matched.

7. The amplifier of claim 1, wherein each of the amplifiers comprises a length of non linear optical fiber and a pump source coupled to the length of optical fibers.

8. The amplifier of claim 1, wherein the pump source provides co-propagation or counter-propagation pumping.

9. The amplifier of claim 1, wherein each of the wavelength converters comprises a semiconductor optical amplifier.

10. An optical amplifier comprising:
a first wavelength converter coupled to receive an optical signal, and which converts a first wavelength band to a second wavelength band;
an optical amplifier coupled to the wavelength converter and which amplifies wavelengths in the second wavelength band; and
a second wavelength converter coupled to the optical amplifier and which converts the second wavelength band to the first wavelength band, wherein the first band is S-band, and the second band is C-band.

11. An optical amplifier comprising:
a first wavelength converter coupled to receive an optical signal, and which converts a first wavelength band to a second wavelength band;
an optical amplifier coupled to the wavelength converter and which amplifies wavelengths in the second wavelength band; and
a second wavelength converter coupled to the optical amplifier and which converts the second wavelength band to the first wavelength band, wherein each of the wavelength converters converts between the S-band and C-band.

12. The amplifier of claim 11, wherein each of the wavelength converters comprises a waveguide formed of a non-linear optical material.

13. The amplifier of claim 1, wherein at least one of the wavelength converters comprises a waveguide formed of lithium niobate or doped lithium niobate.

14. The amplifier of claim 4, wherein at least one of the waveguides is quasi phase matched.

15. The amplifier of claim 11, wherein each of the wavelength converters comprises a length of non linear optical fiber and a pump source coupled to the length of optical fiber.

16. The amplifier of claim 11, wherein the pump source provides co-propagation or counter-propagation pumping.

17. The amplifier of claim 11, wherein at least one of the wavelength converters comprises a semiconductor optical amplifier.

18. An optical amplifier arrangement comprising two stages, the first stage comprising:
a first demultiplexer adapted to receive an optical signal;
a first wavelength converter coupled to the demultiplexer and which converts wavelengths in a first band to a second band;
an optical amplifier coupled to the first wavelength converter and which amplifies wavelengths in the second band; and
a first multiplexer coupled to the optical amplifier;
the second stage comprising;
a second demultiplexer coupled optically to the first multiplexer;
a second wavelength converter coupled to the second demultiplexer and which converts wavelengths in the second band to the first band; and
a second multiplexer coupled to the second wavelength converter.

19. An optical amplifier comprising:
a demultiplexer adopted to receive an optical signal;
a first wavelength converter coupled to the demultiplexer and which converts wavelengths in a first band to a second band;
an optical amplifier coupled to the first wavelength converter and which amplifies wavelengths in the second band;
a second wavelength converter coupled to the demultiplexer and which converts wavelengths in the second band to the first band; and
a multiplexer coupled to the optical amplifier and to the second wavelength converter.

20. The amplifier of claim 19, wherein the first band is C-band, and the second band is S-band.

21. The amplifier of claim 19, wherein each of the wavelength converters converts between the S-band and the C-band.

22. The amplifier of claim 19, wherein each of the wavelength converters comprises a waveguide formed of a non-linear optical material.

23. The amplifier of claim 19, wherein at least one of the wavelength converters comprises a waveguide formed of lithium niobate or doped lithium niobate.

24. The amplifier of claim 23, wherein at least one of the waveguides is quasi-phase matched.

25. The amplifier of claim 19, wherein the amplifier comprises a length of non linear optical fiber and a pump source coupled to the length of optical fiber.

26. The amplifier of claim 19, wherein the pump sources provide co-propagation or counter-propagation pumping.

27. The amplifier of claim 19, wherein each of the wavelength converters comprises a semiconductor optical amplifier.

28. A method of amplifying an optical signal, comprising the acts of:
providing the optical signal in a first band;
optically converting the optical signal to a second band;
optically amplifying the converted signal; and
optically converting the amplified signal to the first band;
wherein the first band is one of the C-band or S-band and the second band is the other of the C-band or S-band.

* * * * *